United States Patent [19]

Porowski et al.

[11] Patent Number: 4,572,548
[45] Date of Patent: Feb. 25, 1986

[54] PIPELOCK

[75] Inventors: Jan S. Porowski, Pittsburgh; William J. O'Donnell, Bethel Park, both of Pa.

[73] Assignee: O'Donnell & Associates, Inc., Pittsburgh, Pa.

[21] Appl. No.: 539,074

[22] Filed: Oct. 4, 1983

[51] Int. Cl.$^4$ .............................................. F16L 21/06
[52] U.S. Cl. ...................................... 285/15; 285/419; 285/286; 285/330; 285/421; 285/323; 285/305; 138/97
[58] Field of Search ................. 285/15, 342, 372, 373, 285/418, 419, 305, 321, 421, 286, 330, 296, 339, 322, 323, 324, 412, 417, 328; 138/99, 97

[56] References Cited

U.S. PATENT DOCUMENTS

| 525,775 | 9/1894 | Wainwright | 285/421 |
| 2,338,307 | 1/1944 | Staggers | 285/373 X |
| 2,597,482 | 5/1952 | Harrison et al. | 285/305 |
| 2,827,312 | 3/1958 | Spencer | 285/322 |
| 3,152,816 | 10/1964 | Smith | 285/15 |
| 3,154,327 | 10/1964 | Rothschild | 285/305 X |
| 3,467,141 | 9/1969 | Smith | 285/15 X |
| 3,469,865 | 9/1969 | Ellenburg | 285/330 |
| 3,495,853 | 2/1970 | Furrer | 285/373 X |
| 4,049,296 | 9/1977 | Harrison | 285/15 |
| 4,171,142 | 10/1979 | Harrison | 138/99 X |

FOREIGN PATENT DOCUMENTS

| 1076453 | 2/1960 | Fed. Rep. of Germany | 285/421 |
| 27955 | 11/1965 | Japan | 285/37 |
| 2113789 | 8/1983 | United Kingdom | 285/305 |

Primary Examiner—Cornelius J. Husar
Assistant Examiner—Eric K. Nicholson
Attorney, Agent, or Firm—Joseph J. Carducci

[57] ABSTRACT

A novel pipelock comprising a first pair of rings facing each other axially, with the inner diameter of each ring at the outer face being smaller than the inner diameter of each ring at the inner face, each of said first pair of rings comprising at least two circumferential parts, means to restrain longitudinal movement of facing circumferential parts outwardly from each other, at least one second ring comprised of at least two circumferential parts connected to each other, outwardly surrounding said first pair of rings, and constraining outward radial movement of said first pair of rings.

5 Claims, 3 Drawing Figures

PIPELOCK

BACKGROUND OF THE INVENTION

1. Field of the Invention

This invention relates to a novel pipelock comprising a first pair of rings facing each other axially, with the inner diameter of each ring at the outer face being smaller than the inner diameter of each ring at the inner face, each of said first pair of rings comprising at least two circumferential parts, means to restrain longitudinal movement of facing circumferential parts outwardly from each other, at least one second ring comprised of at least two circumferential parts connected to each other, outwardly surrounding said first pair of rings, and constraining outward radial movement of said first pair of rings.

2. Information Disclosure Statement

Circumferential cracks tend to develop in piping systems subjected to stress corrosion cracking. These cracks generally occur in the heat-affected zones wherein pipes have been welded together and extend not only circumferentially around the pipe but also through the thickness of the pipe wall. The pipes thus lose their strength and will separate from each other, resulting in leakage of the medium contained therein.

Pipes with detected cracks have been repaired by a weld overlay. However, once cracks have begun in the pipes they can also penetrate through the additional weld overlay. For such reason weld overlays have not been successful in eliminating the dangers of circumferential cracks that develop in piping systems.

SUMMARY OF THE INVENTION

We have discovered a novel pipelock that effectively will hold the ends of pipes or pipe fittings together, even if the cracks referred to above extend around the entire circumference of the pipes or pipe fittings and/or through the walls thereof. Our novel pipelock will also produce axial and circumferential compressive stresses at the weld location, thus reducing crack growth rates.

Our novel pipelock comprises a first pair of rings facing each other axially, with the inner diameter of each ring at the outer face being smaller than the inner diameter of each ring at the inner face, each of said first pair of rings comprising at least two circumferential parts, means to restrain longitudinal movement of facing circumferential parts outwardly from each other, at least one second ring comprised of at least two circumferential parts connected to each other, outwardly surrounding said first pair of rings, and constraining outward radial movement of said first pair of rings.

The novel pipelock defined and claimed herein can better be illustrated by reference to the accompanying drawings.

Figure 1:
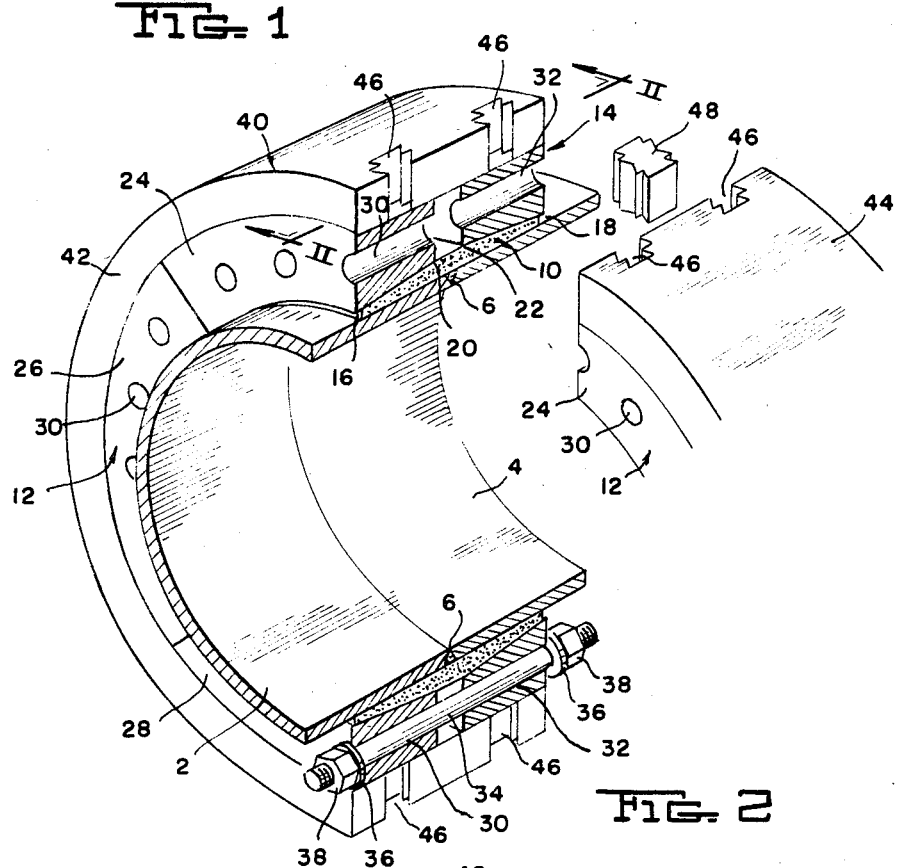
FIG. 1 is a view in perspective of the novel pipelock mounted on a pipe that has already been provided with a weld overlay.
Figure 2:
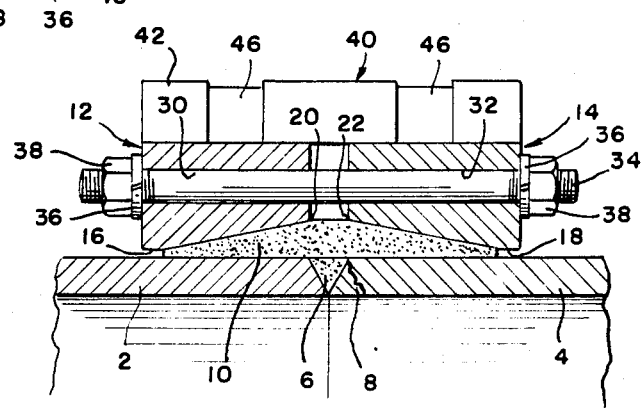
FIG. 2 is a section taken along II—II in FIG. 1.

Referring to FIGS. 1 and 2, reference numerals 2 and 4 refer to abutting pipes that have been welded together by circumferential weld 6. A circumferential crack 8 has already developed in pipe 4 and an overlay weld 10 has been circumferentially disposed over weld 6 to inhibit separation of pipes 2 and 4.

FIGS. 1 and 2 show our novel pipelock in place in the situation described that effectively will hold the ends of pipes 2 and 4 together and stabilize the relationships of the pipe ends to each other wherein a weld overlay has already been utilized. Reference numerals 12 and 14 refer to a first pair of rings having inner diameter at the outer face 16 and 18, respectively, smaller than the inner diameters at the inner face 20 and 22, respectively, of each ring. Each of said first pair of rings comprise at least two circumferential parts. This can be seen from FIG. 1, which discloses circumferential parts 24, 26 and 28 in ring 12. Ring 14 and the remaining portions of rings 12 and 14 are similarly provided with circumferential parts. Rings 12 and 14 are provided with any suitable means to restrain longitudinal movement of facing circumferential parts outwardly from each other. This can be done, for example, by using the means illustrated in FIGS. 1 and 2. Thus, facing circumferential parts of rings 12 and 14 can be provided with aligned openings 30 and 32 through which passes a double-ended bolt 34 threaded on each end thereof adapted to receive lock washer 36 and nut 38. To constrain outward radial movement of the first pair of rings 12 and 14, there is provided at least one second ring 40 comprised of at least two circumferential parts 42 and 44 connected to each other in any suitable manner. This can be done, for example, by using the means illustrated in FIG. 1, wherein the second ring 40 is provided with at least one pair of keyways 46 in which fits a double interlocking key 48.

Figure 3:
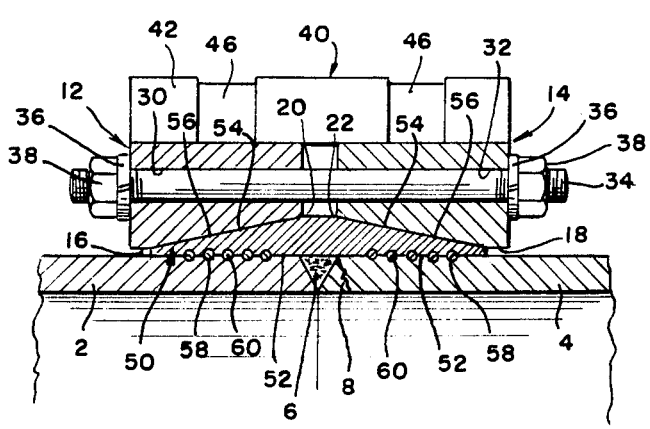
FIG. 3 is a view identical to FIG. 2 but taken of a pipe system that has not been provided with a weld overlay but employs a modification of the novel pipelock of FIGS. 1 and 2.

FIG. 3 is an embodiment of our novel pipelock suitable for use in a pipe system that has not been provided with a weld overlay. The embodiment in FIG. 3 is identical with that of FIGS. 1 and 2, except that it is provided with at least a third ring 50 comprised of at least two circumferential parts, similar to the first two pairs of rings, having an outer surface 52 conforming to the inner surfaces 54 of the first pair of rings. The inner surfaces of the third ring will conform to the outer surfaces of the pipes 2 and 4. Desirably, suitable means are provided to inhibit lateral movement of the novel pipelock on the pipes. This can be done, for example, by using the means illustrated in FIG. 3. Thus, the third ring 50 can be provided with circumferential grooves 56 corresponding to circumferential grooves 58 in pipes 2 and 4 adapted to receive curved rods 60 therein. Such means are effective to inhibit longitudinal movement of third ring 50 on pipes 2 and 4.

Obviously, many modifications and variations of the invention, as hereabove set forth, can be made without departing from the spirit and scope thereof, and, therefore, only such limitations should be imposed as are indicated in the appended claims.

We claim:

1. A novel pipelock adapted to surround and to grip a pair of pipe ends joined by a weldment to produce axial and circumferential compressive stresses at the weld location and thereby reduce crack growth rates comprising a first pair of rings facing each other axially, with the inner diameter of each ring at the outer face being smaller than the inner diameter of each ring at the inner face, each of said first pair of rings comprising at least two circumferential parts, means to restrain movement of facing circumferential parts outwardly from each other, at least one second ring comprised of at least two circumferential parts connected to each other at each adjoining face by at least two keys to secure said latter circumferential parts together to prevent circumferential and out-out-plane relative movement of said latter circumferential parts, outwardly surrounding said first pair of rings, and constraining outward radial movement of said first pairs of rings and at least one ring, comprised of at least two circumferential parts, having an outer surface conforming substantially to the inner surface of said first pair of rings and an inner surface conforming substantially to the outer surface of a pipe adapted to fit therethrough.

2. The novel pipelock of claim 1 wherein said first pair of rings is provided with at least one pair of axial openings facing each other, a bolt mounted in said pair of openings and means disposed on each end of said bolt to restrain outward movement of said circumferential parts outwardly from each other.

3. The novel pipelock of claim 1 wherein said last-named ring is provided with means to inhibit longitudinal movement of said last-named ring on said pipe.

4. The novel pipelock of claim 3 wherein said last-named ring is provided with circumferential grooves corresponding to circumferential grooves in the outer surface of said pipe adapted to receive curved rods therein to inhibit longitudinal movement of said last-named ring on said pipe.

5. The novel pipelock of claim 1 wherein said second ring is composed of two circumferential parts.

* * * * *